Feb. 28, 1950          G. MUNRO          2,498,701
DRILL GRINDER
Filed April 20, 1945          2 Sheets-Sheet 1
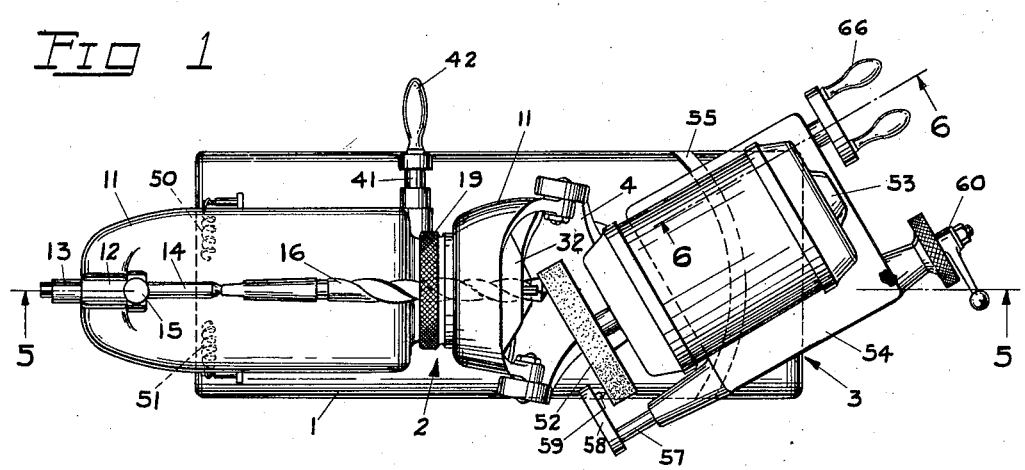
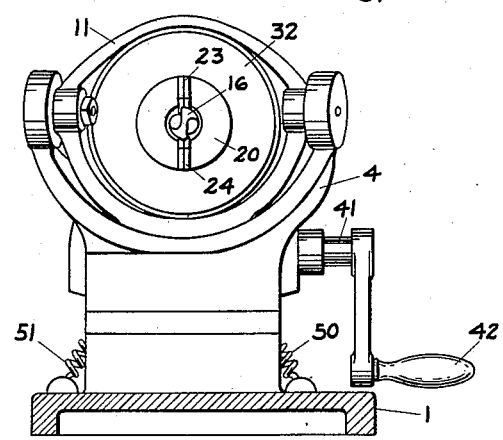
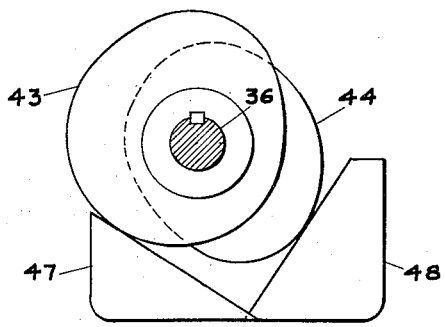
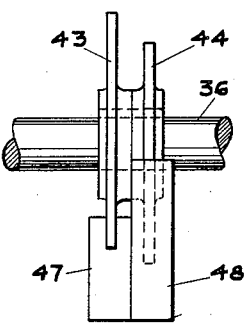
INVENTOR.
GORDON MUNRO
BY
Ralph L. Chappell
ATTORNEY.

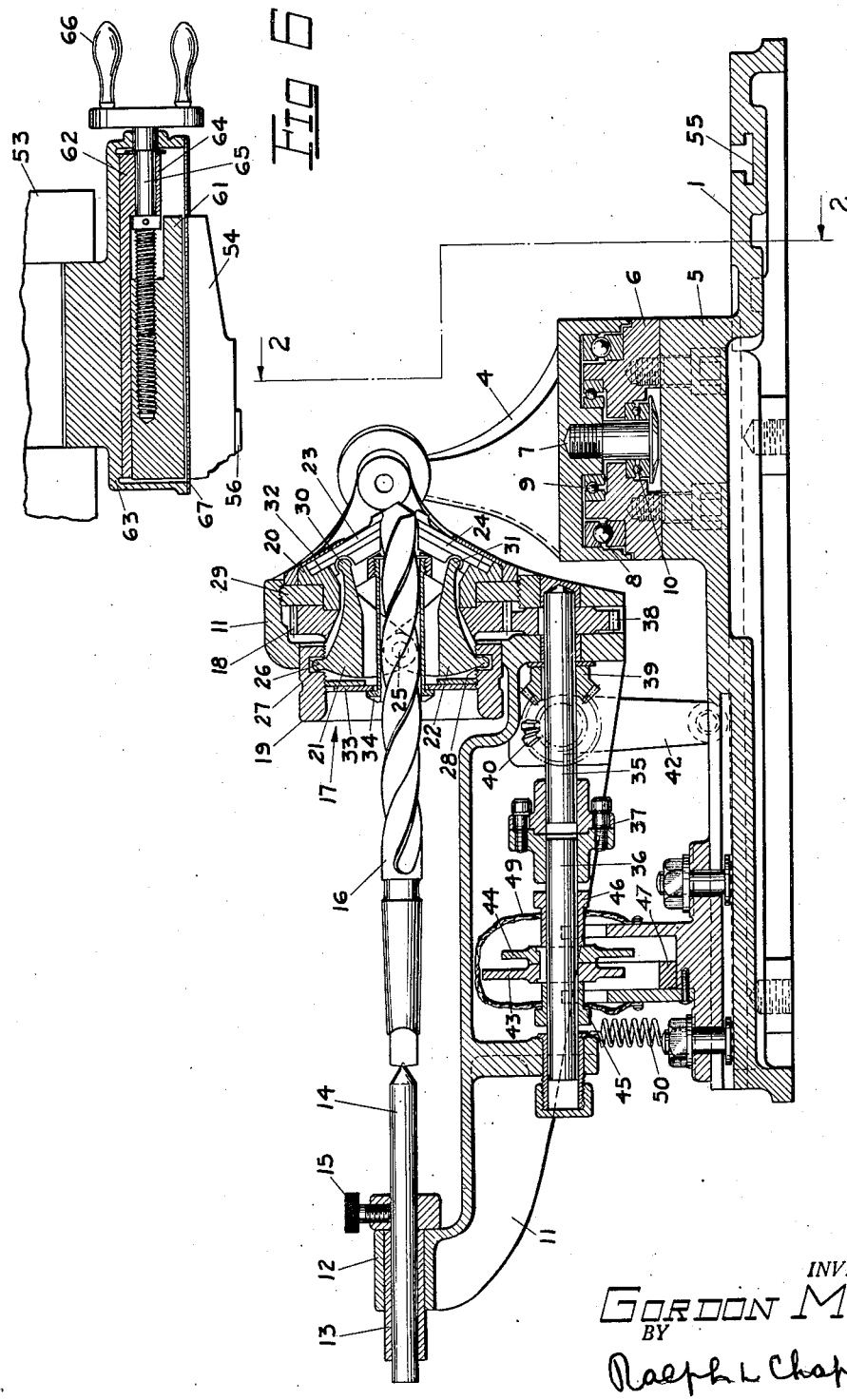

Patented Feb. 28, 1950

2,498,701

UNITED STATES PATENT OFFICE 2,498,701

DRILL GRINDER

Gordon Munro, Bremerton, Wash.

Application April 20, 1945, Serial No. 589,434

15 Claims. (Cl. 51—219)

(Granted under the act of March 3, 1883, as amended April 30, 1928; 370 O. G. 757)

This invention relates to a drill grinding machine particularly adapted to sharpen twist drills.

A twist drill functions best in use if the point has been ground in accordance with certain established principles.

The chisel point of the drill should be sharp and crowned at the center in order that the drill may spin concentrically. The chisel point is preferably shaped as a shallow S to facilitate center chips being forced into the flutes during a drilling operation.

Both ribs should be ground identically in order that each may perform its share of the cutting during a drilling operation.

The drill point angle is defined as the angle at which the cutting edges on the ribs intersect the longitudinal axis of the drill. The drill point angle should be equal to whatever value has been found by experiment to give the best results for a particular drilling job.

The relief angle of a drill point may be defined as the angle measured from the surface of a rib to a conical surface that would intersect the cutting edge and would be inclined throughout the circumference to the longitudinal axis of the drill at the same angle (equal to the drill point angle). The relief angle may be regarded as the sum of two component angles: First, a clearance angle and, second, a drill feed helix angle. The clearance angle is the angle between the surface of the rib of the drill point and the surface of the bottom of a hole being drilled. This latter surface is helical, there being one such helical surface behind each cutting edge as a hole is being drilled. The drill feed helix angle is the angle that the helical surface of the bottom of the hole would make with the conical surface hereinbefore referred to. The magnitude of this angle is determined by the rate of feed of the drill.

It is desirable to leave as much material as possible in the rib behind the cutting edge in order to strengthen the drill and carry away heat and yet it is necessary to provide a sufficient relief angle to allow for the necessary clearance angle and drill feed helix angle. The relief angle should decrease progressively from the cutting edge in order not to provide greater clearance than necessary at the heel of the rib.

Furthermore, in the grinding operation it should be possible to adjust the cutting edge angle and the relief angle ground on the drill point to meet whatever standards are known to give the best results for a particular drilling job.

A drill sharpened in accordance with the principles set forth hereinabove is capable of drilling many more holes without being resharpened and drills holes faster than drills sharpened with these principles disregarded.

It is therefore an object of my invention to provide a drill grinding machine in which a drill placed therein may be ground with the drill point angle and the relief angle at whatever values are known to be best for a particular drilling job.

It is a further object of my invention to provide a drill grinding machine which is capable of adjustment to vary the aforementioned angles as desired.

It is a further object of my invention to provide a drill grinding machine which, after having been adjusted, grinds a drill placed therein at the angles chosen with the operator's performing only a simple mechanical operation.

It is a further object of my invention to provide a drill grinding machine which is capable of adjustment to accommodate various diameters and lengths of drills.

It is a further object of my invention to provide a drill grinding machine having a grinding wheel dresser which is at all times in an operating position, whereby the grinding wheel may be quickly dressed at any time during or between the grinding cycles.

The manner in which I have accomplished these and other objects of my invention will become apparent upon a study of the specification which follows, and the drawings wherein:

Fig. 1 is a top plan view of the drill grinder of my invention.

Fig. 2 is an elevational view of the forward end of the drill holding means used in the drill grinder, taken substantially on the line 2—2, Fig. 5.

Fig. 3 is an end elevational view of the cams and cam rests used in the drill grinder, viewing them from the rear.

Fig. 4 is a side elevational view of the cams and cam rests shown in Fig. 3.

Fig. 5 is a longitudinal vertical sectional view of the drill grinder, taken substantially on the line 5—5, Fig. 1, with the grinding wheel, the motor and motor base omitted for purposes of clarity.

Fig. 6 is a vertical sectional view of the mechanism for moving the motor and grinding wheel longitudinally of the base, taken substantially on the line 6—6, Fig. 1, with portions of the motor and motor base shown in elevation for purposes of clarity.

Referring more in detail to the drawings:

The drill grinder of my invention comprises 2,498,701

3 a base 1. For purposes of description, the mechanism mounted on the base may conveniently be considered in two parts: First, a drill holding means, designated generally as 2, mounted above the rearward end of the base and, second, a drill grinding means, designated generally as 3, mounted above the forward end of the base.

The drill grinding means 3 is adjustably mounted on the base in such a manner that the grinding face of the grinding wheel may be placed at any desired angle with respect to a drill being ground to give any chosen drill point angle and the grinding face may be moved to and maintained in the proper plane with respect to the drill point. The drill holding means 2 is adapted to hold a twist drill being ground against the grinding wheel at predetermined constantly varying angles in order to sharpen the drill point to the desired configuration. The mechanism by which the grinding means and the holding means accomplish the foregoing functions will be explained in the paragraphs that follow.

*The drill holding means*

Referring principally to Fig. 5, it will be seen that the holding means is mounted on the base 1 by means of the yoke 4. The base 1 has an upstanding boss 5 approximately under the rearward edge of the motor. A bearing member 6 is secured to the boss 5 by bolts as illustrated in Fig. 5 or by other suitable means. The yoke 4 is rotatably mounted on the bearing member 6 for movement about a vertical axis by means of the bearing bolt 7. To facilitate pivotal movement of the yoke about the bearing member, I prefer to include the bearing races 8, 9 and 10 between the moving parts of the pivotal joint.

The holding means comprises a housing 11, the forward end of which is pivoted to the arms of the yoke for rotary movement about a horizontal axis rearwardly of the vertical axis on which the yoke is pivoted. The rearward end of the housing 11 has an upstanding boss 12 which is apertured to receive the bushing 13. The drill center 14 is adjustably fitted within the bushing 13 and is held in position by means of the set screw 15. The drill center may thus be adjusted longitudinally within the bushing in order to accommodate drills 16 of different lengths within the holder.

The central forward portion of the housing constitutes a bearing within which the chuck mechanism designated generally as 17, is journaled. The chuck mechanism comprises a ring gear 18, an adjusting nut 19, a cone shaped jaw guide 20, two toggles 21 and 22, two jaws 23 and 24 and two pivot studs 25. The pivot studs 25 are secured in diametrically opposed openings in the ring gear 18. The ring gear also has two diametrically opposed slots perpendicular to the studs 25 into which the toggles 21 and 22 are fitted. The toggles have depending lugs which are apertured to receive the studs 25 to permit pivotal movement of the toggles about the studs. The adjusting nut 19 is threadedly engaged with the ring gear and has an annular groove 26 into which the after toggle knobs 27 and 28 are fitted. The jaw guide 20 is fixed to the ring gear 18 by screws or other suitable means not shown.

The chuck mechanism is held within the housing by means of a bearing ring 29 which is threadedly secured in the housing. The chuck mechanism is thus mounted for free rotation about its longitudinal axis relative to the housing and

4 bearing ring. The jaws 23 and 24 are slidably mounted in the jaw guide 20 and are provided with notches into which the forward knobs 30 and 31 of the toggles are fitted. Rotation of the adjusting nut 19 relative to the ring gear 18 moves the toggles 21 and 22 about the pivot studs 25 and thus open or close the jaws 23 and 24.

As shown in Fig. 2, each of the inner ends of the jaws 23 and 24 is notched to form a finger and a beveled face. The finger is adapted to fit within the flute of a drill 16 and the beveled face grips the margin of the drill. The chuck is thus adapted to grip drills of varying diameters, limited only by the distance to which the jaws may be opened.

In order to protect the chuck mechanism from dust or grit and to retain grease within the mechanism, I provide a series of shields which effectively cover the entire mechanism. A conical shield 32 is secured to the jaw guide 20 and surrounds the forward end of the chuck. An opening is provided at the center of the shield 32 to permit the drill to pass through and to permit movement of the jaws. A second shield 33, Fig. 5, is secured to the after end of the ring gear 18 and fitted to the threads in the adjusting nut 19. An opening is provided at the center to permit the drill to pass through. A third shield 34 comprises a cylindrical sleeve threadedly secured to the jaw guide 20 and extending rearwardly between the toggles 21 and 22 and through the aperture in the shield 33. It will thus be apparent that the mechanism is effectively closed in such a manner that foreign material is kept out and grease retained in the mechanism.

The point on the drill center 14 is aligned with the longitudinal axis of the chuck 17. This point is adapted to abut against the shank of a drill 16 being ground and the chuck grips the drill in the proximity of the drill point. It will be observed from Fig. 5 that the longitudinal axis of the drill 16 is somewhat below the horizontal axis on which the housing 11 is pivoted to the yoke 4, and, Fig. 1, the tip of the chisel point of the drill is slightly forward of this horizontal axis.

Journaled in the housing below the chuck mechanism and drill center is the shaft 35 and the shaft extension 36. The shaft 35 and shaft extension 36 are coupled together by means of a coupling 37, which enables the shaft extension 36 to be adjusted angularly with respect to the shaft 35, for a purpose that will be hereinafter explained.

Keyed to the shaft 35 is a pinion 38, the teeth of which are in mesh with the teeth of the ring gear 18. The ratio of the diameter of the gear 38 to the diameter of the gear 18 is one to two. Therefore the chuck mechanism and drill will make one revolution for each two revolutions of the shaft 35.

There is also keyed to the shaft 35 a bevel gear 39 which is in mesh with a second bevel gear 40 on the crank shaft 41. The crank shaft 41 may be rotated by manually turning the crank 42. Thus, rotation of the crank 42 rotates the shaft 35, the shaft extension 36, the chuck 17, and the drill 16.

A rearward cam 43 and a forward cam 44, Fig. 3, are keyed on the shaft extension 36. The cams are held in position on the shaft by the collars 45 and 46 which are adjustable longitudinally on the shaft. A rearward cam rest 47 and a forward cam rest 48 are mounted on the base and are adjustable longitudinally thereof to enable them to be placed in vertical alignment with the respective cams.

I prefer to employ two cams and two cooperating cam rests in order to provide a firm two-point support for the rear of the holding means. Such support is necessary to insure positively controlled swinging motion of the drill during the grinding operation.

The cams and cam rests may be shaped substantially as shown in Figs. 3 and 4. However, it is possible to obtain the desired type of cam action with numerous other shapes of cams and cam rests, and I do not wish to be limited to the specific shapes illustrated.

The cam and cam rests are covered by a flexible shield 49, Fig. 5, which protects them against the entrance of foreign matter.

A pair of springs 50 and 51 extend between the base and the housing to hold the cams down tightly against the cam rests and thus insure that the cams follow the cam rests at all times.

Drill grinding means

The drill grinding means 3, Fig. 1, comprises a grinding wheel 52, a motor 53, a motor base 54, and a slide mechanism by which the motor is mounted on the motor base.

The forward end of the main base 1 has an arcuate slot 55 in the upper face thereof to receive an arcuate key 56 on the lower face of the motor base 54. The center about which the arcuate slot 55 is constructed is directly below the chisel point of the drill 16 when the point is in position to be ground. Thus, the motor base 54 together with the motor 53 and grinding wheel 52 may be swung to different angles to grind a drill point at any desired drill point angle and the face of the grinding wheel 52 is always at the proper location to contact the drill point.

Drill points are ground at a chosen angle which is known to give the best results for a particular job or material. A scale is engraved or stamped on the upper surface of the base 1 to indicate the angle at which the drill point should be ground. The motor base 54 is swung in the arcuate slot 55 until the edge of the motor base is aligned with the appropriate indicating line on the scale. The point is ground at an angle equal to that indicated on the scale.

During a grinding operation the face of the grinding wheel is worn away somewhat. It becomes necessary to dress the face of the wheel to maintain this face as a plane surface.

I have provided a dresser mechanism which comprises a shaft 57 mounted for pivotal movement and longitudinal adjustment in the motor base, an arm 58 mounted on the shaft, and a stone 59 mounted on the arm in position to be swung across the face of the grinding wheel. The dresser mechanism may be operated by rotating the handle 60 to move the stone across the face of the grinding wheel.

After the wheel has been dressed, it becomes necessary to move the grinding face rearwardly to compensate for the thickness of the material removed during the dressing operation. In order to enable the grinding face to be moved back to the proper plane, I prefer to mount the motor on the motor base by means of an adjustable slide mechanism.

The working parts of the slide mechanism are illustrated in Fig. 6. The mechanism comprises a lower slide member 61 secured to the motor base 54 and an upper slide member 62 secured to the motor 53 through the intermediary of the housing 63. The upper slide member 62 has a depending boss 64 which is bored to act as a bearing for the feed screw 65. This screw comprises a smooth portion rotatably mounted in the bore in the boss 64 and held in longitudinal position by suitable means, as by the collars illustrated. The threaded portion of the feed screw is engaged with the tapped opening in the lower slide 61. The feed screw 65 may be rotated by manually turning the wheel 66. Rotation of the screw moves the upper slide member 62 along the lower slide member 61 and thus moves the motor and grinding wheel longitudinally on the motor base.

A plate 67 is secured to the lower face of the housing 63. The plate and housing 63 cooperate to seal the mechanism against the entrance of foreign material.

Operation

When it is desired to sharpen a drill in the drill grinder of my invention, the drill is first secured in the holding means. The point end of the drill is placed within the chuck mechanism and secured therein by rotating the adjusting nut 19 relative to the ring gear 18. This action pivots the toggles 21 and 22 and thus closes the jaws 23 and 24 on the margins of the drill, leaving the point projecting forwardly of the chuck. The drill center 14 is adjusted to abut against the shank of the drill.

The grinding face of the grinding wheel is adjusted to the chosen drill point angle by swinging the motor base 54 to the chosen angle as indicated on the scale on the base 1. The face of the grinding wheel is moved to the proper plane by rotating the wheel 66 which rotates the feed screw 65.

The motor is started thus rotating the grinding wheel at a suitable velocity to grind the drill. The crank 42 is manually turned to rotate the drill and swing it through the proper angles.

In the usual operation, when viewed from the rear, the grinding wheel rotates in a counter-clockwise direction, the drill rotates in a clockwise direction, and the shaft 35, shaft extension 36 and the cams 43 and 44 rotate in a counter-clockwise direction. However, all of the directions of rotation could be reversed and similar results obtained.

I will consider one revolution of the drill during the grinding operation as constituting a "grinding cycle." The shaft 35, shaft extension 36, and cams 43 and 44 must make two revolutions to turn the drill through a grinding cycle, since the ratios of the diameter of the gear 38 to the diameter of the gear 18 is one to two. The first part of the drill to contact the grinding wheel is the cutting edge at the left as viewed from the rear. I will consider the instant of such contact as the start of a cycle.

At the start of a cycle the cutting edge as it contacts the wheel is substantially horizontal and the shaft 35 and shaft extension 36 are substantially in vertical alignment with the center of the base 1 and sloping slightly to the rear. The cams 43 and 44 are at substantially their lowest position on the cam rests 47 and 48.

As the grinding cycle progresses, the cutting edge leaves the grinding wheel and the area of the rib behind the cutting edge progressively engages the grinding wheel. At the same time the cams 43 and 44 acting on the cam rests 47 and 48 raise the rear end of the housing 11 about its horizontal pivot axis on the yoke 4 and swing the yoke 4 about its vertical pivot axis on the base 1 in a clockwise direction as viewed from above. Since the chisel edge of the drill point is forward of and below the aforesaid horizontal axis, raising of the rear end of the housing lowers the chisel edge. The lowering of the chisel edge prevents destruction or damaging of this edge. The swinging on the vertical axis moves the rib engaged with the wheel closer to the wheel. The movement of the rib toward the wheel permits additional material to be ground from the rib behind the cutting edge to provide the necessary relief angle.

As the cycle progresses, the movement about the vertical axis decreases in order not to provide an excessive relief angle at the heel of the rib.

When the heel of the rib and the chisel point leave the wheel, the cams acting on the cam rests lower the rear end of the housing about the horizontal axis and swing the yoke about the vertical axis in a counter-clockwise direction as viewed from above. When the shaft 35 has made one complete revolution, the drill has returned to the position it occupied at the start of the cycle except that the next rib is brought to a position to contact the grinding wheel. The counter-clockwise swinging of the yoke carries the point of the drill away from the wheel to allow the next cutting edge to come into grinding position without being damaged by premature contact with the grinding wheel.

The half grinding cycle described above is then repeated on the next rib.

I have illustrated one arrangement of cams and cam rests which will impart the proper swinging motion to the drill as it is being ground. This arrangement is shown in Figs. 3 and 4. Fig. 3 shows the cams and cam rests viewed from the rear. The shaft extension 36 rotates in a counter-clockwise direction as viewed from this direction. It will be seen that further rotation of the shaft from the position shown in Fig. 3 raises the shaft but produces no great amount of lateral movement. This is the position of the cams on the rests when the mid-portion of the rib is being ground and the heel is approaching the wheel. The lateral movement at this point is small in order not to give excessive relief to the heel.

When it is desired to increase or decrease the relief angle ground on the drill point, the shaft extension 36 is adjusted angularly relative to the shaft 35 through the coupling 37. This adjustment advances or retards the instant at which the cutting edge of the drill engages the grinding wheel with respect to the instant at which the cams are at their lowest position. If the instant at which the cutting edge of the drill engages the wheel is advanced, a greater relief angle is provided.

In recapitulation it may be observed that the drill holding chuck mechanism 17 during the grinding cycle undergoes a motion having components simultaneously about three axes. Considering, for example, a reference plane fixed relative to and parallel to the base 1, this motion may be considered as comprising rotation about the vertical axis through the bolt 7 perpendicular to the reference plane, rotation about a horizontal axis parallel to the reference plane and passing through the centers of the pivots in the upstanding arms of the yoke 4 and rotation about the longitudinal horizontal axis of the chuck itself which coincides with the axis of the drill 16 being ground and is also parallel to the reference plane. This complex motion is produced by rotation of the handle 42 transmitted through the gear and cam mechanisms as hereinbefore described. By the choice of gears and the design of cams not only is the relative proportion of the magnitudes of the three components of the motion predetermined, but also the variation throughout the grinding cycle of the space-time path of each component of the motion is independently predetermined.

When it is desired to dress the grinding wheel, the handle 60 is rotated. Such rotation rotates the shaft 57 and swings the arm 58 across the face of the grinding wheel 52 in such manner that the stone 59 contacts the grinding wheel and smooths it off to a plane surface.

After the grinding wheel has been dressed, it becomes necessary to advance it rearwardly in order to bring the surface back to the plane it occupied before the dressing operation. Rearward movement of the grinding wheel is accomplished by rotating the wheel 66. Such rotation rotates the feed screw 65 in the bearing in the upper slide member 62 and in the tapped opening in the lower slide member 61. This moves the upper slide, the motor and the grinding wheel any desired amount along the lower slide member 61.

The distance which the grinding wheel should be moved to bring it back to the proper plane may be determined in any suitable manner. However, I prefer to employ the novel mechanism described and claimed in my co-pending application, Serial Number 589,435, filed April 20, 1945, now Patent No. 2,435,234, dated Feb. 3, 1948, for this purpose.

I have described one embodiment of my invention. However, it should be apparent to those skilled in the art that the device is susceptible to numerous modifications without departing from the spirit of the invention. Therefore, I do not wish to be limited by the disclosures set forth hereinbefore but only by the scope of the appended claims.

The invention described herein may be manufactured and used by or for the Government of the United States of America for governmental purposes without the payment of any royalties thereon or therefor.

I claim:

1. A drill grinder comprising a base, a grinding wheel, driving means for the grinding wheel mounted on the forward portion of said base for angular and longitudinal adjustment on said base, a yoke pivotally mounted on said base for rotary movement about a vertical axis, a drill holder comprising a housing pivotally mounted adjacent its forward end on said yoke for rotary movement about a horizontal axis rearward of said vertical axis, a drill center adjustably mounted adjacent the rearward end of said housing, a chuck journaled in the housing between the forward end of the drill center and the horizontal axis of pivoting of the housing on the yoke and having its axis of rotation in line with the drill center and below the horizontal axis of pivoting of the housing on the yoke, said drill center and chuck being adapted to secure a drill in the drill holder with the point of the drill in position to contact the grinding wheel, a shaft journaled in said housing below the chuck and drill center, means for rotating said shaft, gear means for transmitting rotary movement of the shaft to the chuck and thereby to a drill held therein, said gear means rotating the chuck once for each two revolutions of the shaft, and cams secured to said shaft rearwardly of said gear means, cam rests mounted on said base with which said cams are cooperable to swing the yoke about its vertical axis and the housing about its horizontal axis when said shaft is rotated to thereby impart a swinging motion to the rotating drill whereby each rib of the drill point is presented at a predetermined but varying angle to grind the ribs identically to a desired configuration, and yieldable means connected between the rearward portion of the housing and the base to keep the cams in contact with the cam rests.

2. A drill grinder comprising a base, a grinding wheel and driving means therefor mounted on a forward portion of said base, for angular and longitudinal adjustment on said base, a yoke pivotally mounted on said base for rotary movement about a vertical axis, a drill holder comprising a housing pivotally mounted adjacent its forward end on said yoke for rotary movement about a horizontal axis, means on said housing for rotatably securing a drill in the holder, a shaft journaled in said housing below said drill securing means, means for rotating said shaft, means for transmitting rotary movement of the shaft to a drill secured in the housing and means on said shaft cooperating with means on said base to swing the yoke about its vertical axis and the housing about its horizontal axis when said shaft is rotated to impart a swinging motion to a rotating drill.

3. In a drill grinder, a base, a frame supported on said base for movement on universal pivot axes, chuck means journaled in said frame for securing a drill therein against longitudinal movement with respect to said frame, means for swinging said frame about its universal axes of pivoting, said last named means including at least one cam rotatably supported in said frame and a cooperating cam rest in said base, and means for rotating said cam and said chuck means.

4. In a drill grinder, a base, a frame supported on said base for movement on universal pivot axes, chuck means journaled in said frame, a shaft journaled in said frame, means for transmitting rotary movement of said shaft to said chuck means at the rate of one revolution of said chuck means for each two revolutions of said shaft, cooperable means connected with said shaft and said base for swinging said frame about its universal axes of pivoting on rotation of said shaft, and means for rotating said shaft.

5. In a drill grinder, a base, a frame supported on said base for movement on universal pivot axes, chuck means journaled in said frame, a shaft journaled in said frame, means for transmitting rotary movement of said shaft to said chuck means at the rate of one revolution of said chuck means for each two revolutions of said shaft, cam means on said shaft, cam rests on said base with which said cam means are cooperable to swing said frame about its universal axes of pivoting on rotation of said shaft, and means for rotating said shaft.

6. In a drill grinder, a base, a yoke supported on said base for pivotal movement on a vertically disposed axis, a frame supported on said yoke for pivotal movement on a horizontally disposed axis, chuck means journaled in said frame for rotation on a horizontally disposed axis transverse to and below said first named horizontally disposed axis, a shaft journaled in said frame, means for transmitting rotary movement of said shaft to chuck means, cams on said shaft, cam rests on said base with which said cams are cooperable to swing said yoke about its vertically disposed axis and said frame about its horizontally disposed axis on rotation of said shaft, and means for rotating said shaft.

7. A drill grinder comprising a base, a grinding face rotatably supported on said base, a frame supported on said base for universal pivotal movement, chuck means journaled in said frame, and adapted to support a drill in position to contact said grinding face, a shaft journaled in said frame, said shaft including a pair of sections longitudinally joined for relative angular adjustment, means connected to one of said sections for transmitting rotary movement of said shaft to said chuck means, cam means on the other of said sections, means on said base with which said cam means are cooperable to swing said frame about its universal axes of pivoting on rotation of said shaft for moving the point of a drill secured in said chuck means toward or away from said grinding face, the position of relative angular adjustment of said shaft sections determining the relation between the rotated position of the drill and the contact of the drill with said grinding face, and means for rotating said shaft.

8. In a drill grinder, a base, a yoke supported on said base for pivotal movement on a vertically disposed axis, a frame supported on said yoke for pivotal movement on a horizontally disposed axis, chuck means journaled in said frame for rotation on a third axis transverse to and not intersecting said horizontally disposed axis, said chuck means being adapted to secure a drill against longitudinal movement with respect to said frame, and means for simultaneously swinging said yoke in a predetermined path about its vertically disposed axis and said frame about its horizontally disposed axis and for rotating said chuck means.

9. A drill grinder comprising a base, a grinding face rotatably supported on said base, a yoke supported on said base for pivotal movement on a vertically disposed axis, a frame supported on said yoke for pivotal movement on a horizontally disposed axis, chuck means journaled in said frame for rotation on a third axis transverse to and not intersecting said horizontally disposed axis, said chuck means being adapted to secure a drill against longitudinal movement with respect to said frame, and means for simultaneously swinging said yoke in a predetermined path about its vertically disposed axis and said frame about its horizontally disposed axis and rotating said chuck means, the resultant movement of the point of a drill secured in said chuck means being such that the point is simultaneously rotated and moved toward or away from said grinding face in predetermined paths while fixed longitudinally in the frame.

10. In an apparatus of the character described, a base, a drill grinder on said base, a drill holder for holding a drill in grinding contact with said grinder, means mounting the drill holder for movement during the grinding operation relative to said base comprising rotation about an axis normal to a reference plane fixed relative to said base, rotation about a second axis parallel to said reference plane, and rotation about a third axis which is its longitudinal axis and is also skew to said second axis and means for producing, through a grinding cycle, motion of said drill holder having components simultaneously about each of said three axes, each of which components has a predetermined relative value at every instant throughout said grinding cyle.

11. In an apparatus of the character described, a base, a drill grinder on said base, a drill holder for holding a drill in grinding contact with said grinder, means mounting the drill holder for movement during the grinding operation relative to said base comprising rotation about an axis normal to a reference plane fixed relative to said base, rotation about a second axis parallel to said reference plane, and rotation about a third axis which is its longitudinal axis and is also transverse to and not intersecting said second axis, and means for producing motion of said drill holder during the grinding operation having simultaneously components of predetermined relative proportions about all three of said axes.

12. In an apparatus of the character described, a base, a frame supported on said base for pivotal movement about an axis normal to a reference plane fixed relative to said base and about an axis parallel to said reference plane, chuck means for holding a workpiece to be formed, said chuck means being journaled in said frame for rotation on its longitudinal axis disposed transverse to and not intersecting said second axis, said second axis lying adjacent that end of said chuck means from which projects that surface of the workpiece which is to be formed, the projections of said second and third axes on said reference plane intersecting each other at an acute angle, and means for simultaneously rotating said chuck means about its longitudinal axis and swinging said frame in a predetermined path about both said other axes.

13. In a drill grinder, a base, means supported on said base for pivotal movement about an axis normal to a reference plane fixed relative to said base, a frame supported on said means for pivotal movement about an axis parallel to said plane, chuck means journaled in said frame for rotation on its longitudinal axis disposed transverse to and not intersecting said second axis, and means for simultaneously performing the three functions of swinging said first named means about said first axis in a predetermined manner, and swinging said frame about said second axis in a predetermined manner and rotating said chuck means about its longitudinal axis.

14. The device of claim 13 wherein said last named means includes cam mechanism coacting between said base and the swingable elements.

15. The device of claim 13 wherein said last named means includes mechanism for rotating said chuck means through a continuous cycle of at least 360° whereby all cutting edges of a drill held in the chuck may be ground in one cycle.

GORDON MUNRO.

REFERENCES CITED

The following references are of record in the file of this patent:

UNITED STATES PATENTS

| Number | Name | Date |
| --- | --- | --- |
| 704,348 | Lapointe | July 8, 1902 |
| 777,247 | Dahl | Dec. 13, 1904 |
| 1,016,891 | Mill et al. | Feb. 6, 1912 |
| 1,020,860 | Vauclain | Mar. 19, 1912 |
| 1,388,039 | Hinz | Aug. 16, 1921 |
| 1,417,364 | Wallace | May 23, 1922 |
| 1,481,260 | Hemenway | Jan. 22, 1924 |
| 1,617,167 | Schramm | Feb. 8, 1927 |
| 1,993,418 | Smyser | Mar. 5, 1935 |
| 2,098,267 | Weishampel | Nov. 9, 1937 |
| 2,209,228 | Judge | July 23, 1940 |
| 2,363,482 | Clark | Nov. 28, 1944 |

FOREIGN PATENTS

| Number | Country | Date |
| --- | --- | --- |
| 812,340 | France | Feb. 1, 1937 |